United States Patent [19]

Sawyer

[11] Patent Number: 5,634,195
[45] Date of Patent: May 27, 1997

[54] SYSTEM AND METHOD FOR SETTING OF OUTPUT POWER PARAMETERS IN A CELLULAR MOBILE TELECOMMUNICATION SYSTEM

[75] Inventor: Francois Sawyer, Hubert, Canada

[73] Assignee: Telefonaktiebolaget LM Ericsson, Stockholm, Sweden

[21] Appl. No.: 411,426

[22] Filed: Mar. 27, 1995

[51] Int. Cl.[6] .................................................. H04B 7/26
[52] U.S. Cl. ................... 455/54.1; 455/67.1; 455/127
[58] Field of Search ...................... 455/54.1, 54.2, 455/67.1, 67.7, 69, 70, 116, 127; 375/216

[56] References Cited

U.S. PATENT DOCUMENTS

| 4,435,840 | 3/1984 | Kojima et al. . | |
| 4,580,262 | 4/1986 | Naylor et al. | 371/5 |
| 4,639,914 | 1/1987 | Winters | 370/110.1 |
| 4,754,231 | 6/1988 | Chapman et al. | 329/59 |
| 4,775,995 | 10/1988 | Sawa | 330/279 |
| 4,811,421 | 3/1989 | Havel et al. | 455/69 |
| 5,050,234 | 9/1991 | Ohteru | 455/34.1 |
| 5,203,008 | 4/1993 | Yasuda et al. | 455/33.1 |
| 5,212,823 | 5/1993 | Fujii et al. | 455/54.1 |
| 5,241,690 | 8/1993 | Larsson et al. | 455/54.1 |
| 5,305,468 | 4/1994 | Bruckert et al. | 455/69 |
| 5,487,180 | 1/1996 | Ohtake | 455/69 X |

FOREIGN PATENT DOCUMENTS

WO92/16059 9/1992 WIPO .
WO95/33313 12/1995 WIPO .

*Primary Examiner*—Chi H. Pham
*Attorney, Agent, or Firm*—Jenkens & Gilchrist, P.C.

[57] ABSTRACT

A system and method for automatically determining and setting the optimum output power values on base station and mobile station radio channels in a cellular system. The invention sets power levels for fixed power radio channels, and sets initial and maximum power levels for variable power radio channels. The present invention utilizes data obtained from automatic digital voice channel power regulation in either the base station, or mobile station, or both when determining and setting optimum output levels on radio channels of the system.

34 Claims, 15 Drawing Sheets

| Channel Types | Power Level Control |
|---|---|
| Analog Control Channel, down link<br>up link | fixed, manually set<br>fixed, manually set |
| Analog Voice Channel, down link<br>up link | fixed, manually set<br>variable, set according to received signal strength at base station, initial level manually set |
| Digital Control Channel, down link<br>up link | fixed, manually set<br>fixed, manually set |
| Digital Voice Channel, down link<br>up link | variable, automatic regulation<br>variable, automatic regulation |

FIG. 6

SYSTEM AND METHOD FOR SETTING OF OUTPUT POWER PARAMETERS IN A CELLULAR MOBILE TELECOMMUNICATION SYSTEM

BACKGROUND OF THE INVENTION

1. Technical Field of the Invention

This invention relates to cellular mobile telecommunications systems, and more particularly, to a system and method for automatically verifying and setting the optimal base station and mobile station radio channel output power values.

2. Description of Related Art

Wireless communication systems, including cellular mobile telephone communications systems, provide telephony services between mobile users and landline users. A system may be analog only, digital only or a dual mode system capable of both analog and digital operation. Analog cellular communication systems employ conventional frequency modulation of speech for broadcasting, while digital Time Division Multiple Access (TDMA) cellular telecommunications systems convert speech into digital samples utilizing voice coders in both the mobile and the base station. These digitized samples are transmitted between a mobile station and a base station according to the TDMA structure specified for a particular communications system. The speech samples are encoded with error protection which enables the measurement of the quality of the transmitted signal by calculating the Bit Error Rate (BER) at the receiving end. A low level of BER depends on a good quality radio channel that is undisturbed by interference.

Conventionally, the output power of each of the radio channels in the base station is set manually by an operator. The operator usually selects the same value of output power level for all channels of the base station, including the analog control and voice channels, as well as the digital control and voice channels. The base station output power values remain fixed until the operator manually sets and defines a new value.

On the other hand, the output power of the mobile station on the digital or analog voice channel during conversation is normally regulated in accordance with commands received from the base station. The levels specified by the transmitted commands are typically according to measurements made at the base station on the analog or digital voice channel. However, the initial power level the mobile station assumes when a conversation is first started on either an analog or digital voice channel is set according to an operator-defined parameter transmitted by the base station on the control channel. Further, the mobile station power output level when transmitting on the control channel is also set according to an operator-defined value.

One of the problems associated with the aforementioned methods of setting the output power for either mobile or base stations is that these methods fail to adequately optimize the power levels needed for good quality transmission and reception. If the power level of a base station is set too high, excessive radio interference is created within the coverage area of other base stations which reuse the same channel frequencies. If the power level is too low, on the other hand, unacceptable reception in the mobile or base stations results from insufficient signal strength.

Since the operator normally sets the requisite power levels based on a worst case scenario, it has been observed in many mobile radio communication systems that the power levels used are significantly higher than necessary to provide good radio coverage within the range of the base stations.

A separate commonly assigned patent application, Ser. No. 08/061,000, filed May 14, 1993 now U.S. Pat. No. 5,574,982, describes an invention entitled "Method and Apparatus for Transmission Power Regulation in a Radio System". According to this invention, reports of BER during conversations on the digital voice channel are monitored and the transmitting station output power on the digital voice channel is continuously adjusted to improve performance. The transmitting station can be either the base station or mobile station. The aim of the invention is not to obtain a perfect transmission on each digital voice channel, which would require high power signals from the mobile and base stations, but to optimize the balance between power and quality in order to obtain an acceptable level of bit errors on the digital voice channels.

This method, however, cannot be applied to analog voice channels because there is no means for the receiving mobile station to report to the transmitting base station on the quality of the received signal. Also, this method cannot be applied to digital or analog control channels because the control signal is used to communicate with multiple mobile stations at different ranges within the control area of the base station. Thus the operator still needs to define a base station output power level for analog voice channels, and an output power level for both the mobile and base station digital and analog control channels. Initial values for the mobile station analog and digital voice channels also must be defined. In addition the operator also needs to define a maximum power level value that must not be exceeded by the output power regulation mechanism in the digital voice channels of both the mobile and base stations.

Accordingly, it would be a distinct advantage to have a system and method for setting fixed system parameters such as power levels for the base station analog and digital control channels, the base station analog voice channels, the mobile station analog and digital control channels, and for setting initial power levels for the mobile station analog and digital voice channels. It would also be an advantage to have a system and method for setting a maximum power level for the power regulation mechanism in the digital voice channels of both the mobile and base stations. The present invention provides such a system and method.

SUMMARY OF THE INVENTION

The present invention is a system and method for automatically verifying and setting the optimum base station and mobile station output power levels on certain system radio channels in a cellular mobile telecommunication system. The invention is applicable for use on particular radio channels that cannot be efficiently regulated by any process that makes quality measurements at a receiving device on a received signal transmitted on the radio channel, and makes appropriate adjustments to the power level of that channel in the transmitting device. In typical cellular communications systems these channels include the base station analog and digital control channels, base station analog voice channels, and mobile station analog and digital control channels.

The present invention utilizes the results of monitoring the power level values used on base station or mobile station radio channels that are automatically regulated by a separate regulation function. The separate regulation function may be a known method of power regulation for automatically regulating the base station or mobile station digital voice channels.

In one aspect, the present invention provides a system and method for determining a maximum output power level used on the automatically regulated channels of a base station, comparing this maximum output power level with output power levels set for other channels of the base station, and then reporting discrepancies between the maximum output power level of the regulated channels and the output power levels set for the other channels to the system operator for evaluation and possible instigation of manual adjustment to the power levels or the other channels.

In another aspect, the present invention provides a system and method of determining a maximum output power level used on automatically regulated channels of mobile stations operating within the area of a base station, comparing the maximum output power level with output power levels set for other channels of the mobile stations, and then reporting discrepancies between the maximum output power level of the regulated channels and the output power levels set for the other channels to the system operator for evaluation and possible instigation of manual adjustment to the power levels of the other channels.

In another aspect, the present invention provides a system and method for determining maximum output power levels used on automatically regulated channels of a base station, comparing certain of the maximum output power levels with certain output power levels set for other channels of the base station, and in response thereto automatically adjusting the output power levels for each of the other channels. In particular, this adjustment may comprise setting the output power levels for the other channels to the maximum output level of the automatically regulated channels.

In still another aspect, the present invention provides a system and method for determining maximum output power levels used on automatically regulated channels of mobile stations operating within the area of a base station, comparing certain of the maximum output power levels with certain output power levels set for other channels of the mobile stations and in response thereto automatically setting the output power levels for each of the other channels of the mobile stations to the maximum output level of the automatically regulated channels.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 6 is a table which illustrates the channel types and the method of power control used for each channel type in a conventional IS-54B system using digital voice channel power regulation;

DETAILED DESCRIPTION OF EMBODIMENTS

Figure 1:
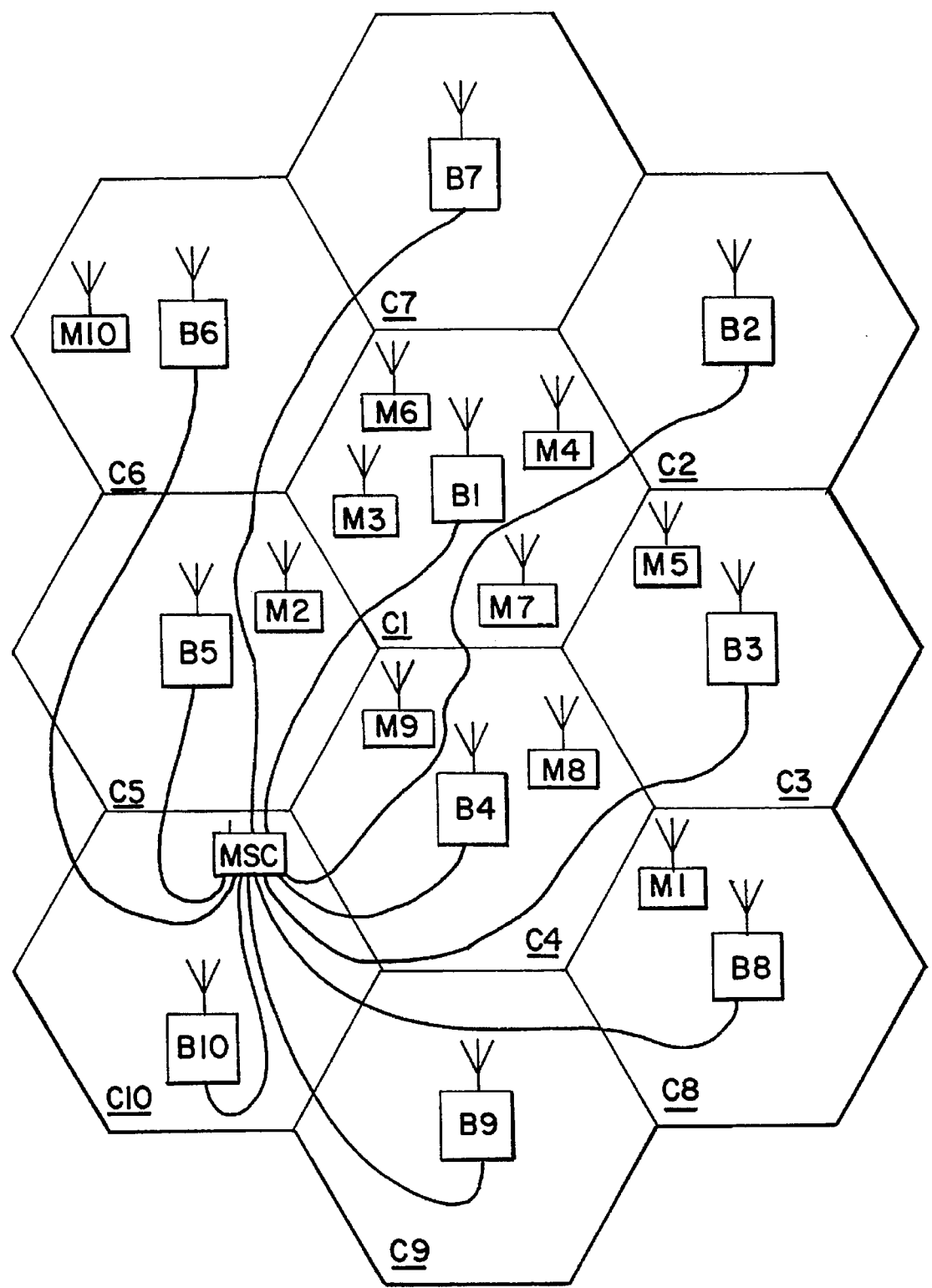
FIG. 1 is a block diagram illustrating a cellular radio communication system within which the present invention is implemented.

Referring to FIG. 1, there is illustrated a conventional cellular radio communication system of the type to which the present invention generally pertains. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of the cells C1–C10, respectively, and are equipped with omni-directional antennas. However, in other configurations of the cellular radio system, the base stations B1–B10 may be located near the periphery, or otherwise away from the center of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system within which the present invention is implemented.

With continuing reference to FIG. 1, a plurality of mobile stations M1–M10 may be found within the cells C1–C10.

Again, only 10 mobile stations are shown in FIG. 1 but it should be understood that the actual number of mobile stations will be much larger in practice and will invariably greatly exceed the number of base stations. Moreover, while none of the mobile stations M1-M10 may be found in some of the cells C1-C10, the presence of absence of the mobile stations M1-M10 and any particular one of the cells C1-C10 should be understood to depend in practice on the individual desires of the mobile stations M1-M10 who may roam from one location in the cell to another or from one cell to an adjacent cell or neighboring cell, and even from one cellular radio system served by an MSC to another such system.

Each of the mobile stations M1-M10 is capable of initiating or receiving a telephone call through one or more of the base stations B1-B10 and a mobile switching center MSC. A mobile switching center MSC is connected by communication links, e.g., cables, to each of the illustrative base stations B1-B10 and to the fixed public switched telephone network PSTN, not shown, or a similar fixed network which may include an integrated system digital network (ISDN) facility. The relevant connections between the mobile switching center MSC and the base stations B1-B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each MSC may control in a system the administration of communication between each of the base stations B1-B10 and the mobiles M1-M10 in communication with it. For example, an MSC will control the paging of a mobile station believed to be in the geographic area served by its base stations B1-B10 in response to the receipt of a call for that mobile, the assignment of radio channels to a mobile station by a base station upon receipt of page response from the mobile station, as well as the handoff of communications with a mobile station from one base station to another in response to the mobile traveling through the system, from cell to cell, while communication is in progress.

Each of the cells C1-C10 is allocated a plurality of voice or speech channels and at least one control channel, such as a forward control channel (FOCC). The control channel is used to control or supervise the operation of mobile stations by means of information transmitted to and received from those units. Such information may include incoming call signals, outgoing call signals, page signals, page response signals, location registration signals, voice channel assignments, maintenance instructions, and "handoff" instructions as a mobile station travels out of the radio coverage of one cell and into the radio coverage of another cell.

Numerous cellular mobile systems have been proposed in the art and consequently the person skilled in the art does not require a detailed description of how a system, such as the one illustrated in FIG. 1, operates in order to understand and apply the present invention. This invention has application to all types of cellular communications systems in which regulation of transmission power can be implemented. This includes the new PCS systems which operate in the 1900 MHz range.

In an embodiment of the invention, automated setting of output power values for some, but not all, of the channels is implemented into a cellular system, like that in FIG. 1, operating according to the EIA/TIA IS-54-B standard which is hereby incorporated by reference. The IS-54 standard defines a dual analog/digital system. In such a dual analog/digital system, the output power levels on the base and mobile station digital voice channels are commonly automatically regulated.

The automatic regulation of the digital voice channel power levels may be accomplished in accordance with the invention disclosed in previously referenced commonly assigned U.S. patent application Ser. No. 08/061,000, filed May 14, 1993. This application is hereby incorporated by reference. In accordance with this known method of automatic power regulation, digital voice channel transmission power levels are determined either by an MSC in cooperation with the system base stations or by the base stations alone. After receiving a signal from a mobile, a base station measures various parameters associated with the received signal to transmission power order to be sent to the mobile station as described below. It will be understood that it is usually better for the MSC and/or base stations to control the necessary power regulations tasks, although in principle the mobile stations could also be used.

The digital voice channel power level for base to mobile station (down-link) or mobile to base (up-link) transmissions is regulated to attain a target carrier to interference (C/I) ratio that, in general, is a monotonically decreasing function of the interference level present on the channel and of the gain (negative path loss) involved in the transmission. Thus, the power regulation scheme does not involve a fixed target C/I ratio or a target received signal strength. On the other hand, it may be necessary to determine the interference level, and in the general case the path loss or gain of the channel, to find the appropriate target C/I ratio.

In the following description of the digital voice channel regulation function in accordance with the teachings of the referenced application, the interference level is designated by I when describing the C/I ratio, (traditional) and by i in the formulas, but they are equivalent. Parameters such as p, p', g, i, I, P, SS, $\alpha$, B and C/I are advantageously used in the logarithmic form of dB. Thus, the gain g, which is derived from a difference between the received power level and the known transmission power level as described below, is given simply by a subtraction. The parameters may instead be used in their equivalent linear forms with appropriate adjustments to the formulas.

To determine the interference level i, a signal quality measurement, for example the BER or bit error content, is made by the receiving station in any of several ways known by those of ordinary skill in the art. In EIA/TIA IS-54-B, the synchronization word (SYNC) and/or the digital verification color code (DVCC) received by the receiving station on the digital voice channel can be compared with the known sequence or code transmitted. In this way, the number of errors can be determined over time. From this BER value, the corresponding C/I ratio can be determined by using an empirical translation table as known in the art. Then, if the received signal strength SS is also measured, the interference i can be determined from the following relationship:

$$i = SS - c/l$$

where all of the parameters are in dB.

For the general voice channel power regulation technique, the channel gain or path loss is readily determined from the difference between the received power level (which can be measured) of a connection and its transmission power level (which can be known a priori). If those levels are measured in dB, simple subtraction yields the desired path loss.

Figure 2:
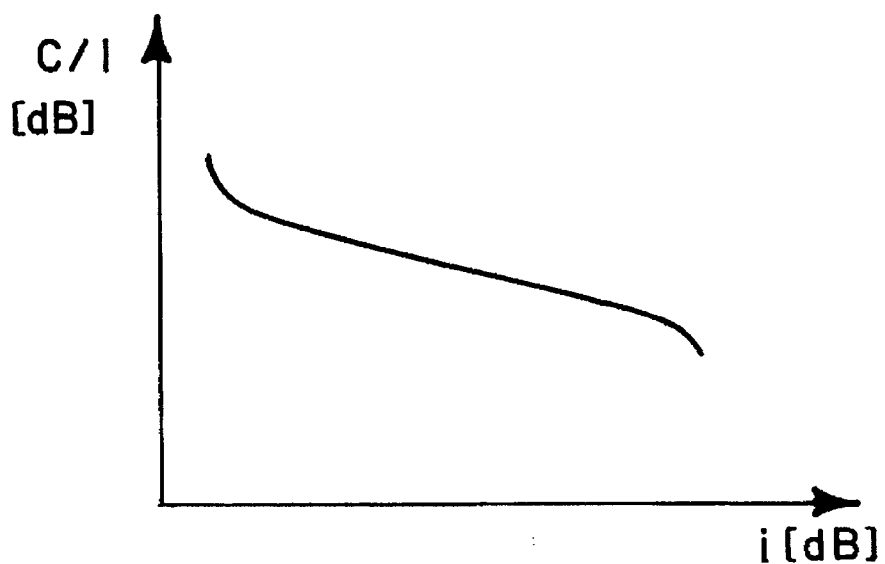
FIG. 2 is a graphical representation of a regulation function used in digital voice channel power regulation.

An example of the proper functional relationship between the target C/I ratio and the interference level is shown in FIG. 2. It will be understood that as the interference increases, the transmission power increases to compensate, but from the figure the transmitting station will not aim at the same C/I ratio, but at a lower ratio. Since the increase in interference "seen" by other connections due to the power increase is then lower than it would have been for a power increase aimed at the "old" C/I ratio, the system can converge to a new, although lower, C/I ratio as the transmitters for those other connections increase their transmission powers.

Any monotonically decreasing function may be appropriate, provided the function has a first derivative of the C/I target with respect to the interference that is in the range of about −2 to 0. This is needed for stability. It is also desirable for that derivative to be in the range of about −1 to 0 in order to increase capacity in the system. It now appears that a good value is about −0.3. Transmission power regulation produces a stable system having graceful degradation at higher traffic levels where the interference is higher and thus the C/I target will be lower.

The C/I target is also functionally related to the path loss or gain in the connection, and the shape of the relationship can be similar to that shown in FIG. 2. In particular, a monotonically decreasing function should be used, and the first derivative of the C/I target with respect to the gain is not critical but can be in the range of 0 to 1.

The following general relation exhibits the voice channel power regulation principle. Regulation is performed periodically according to:

$$p = \alpha - B_g(g) + B_i(i)$$

where $0 < dB_i/di < 1$ for stability. In the foregoing general relation, p is the transmission power of the transmitting station; $\alpha$ is a predetermined constant; $B_g(g)$ is a predetermined function of the gain g in the connection (for either the up- or the down- link); and $B_i(i)$ is a predetermined function of the interference power (disturbance) at the receiving station. The interference power is the sum of contributions from other call connections using the same channel. The origin of co-channel interference is irrelevant to performance, although co-channel interference in a cellular system most often arises between transmitters in different cell clusters because frequency planning typically avoids same-cluster co-channel disturbances.

The digital voice channel power regulation scheme is based in the general case on the particular connection's gain and interference level. The general relation indicates the steady-state condition but can be used in an iterative process to reach the steady state. It will be understood that the relationship shown in FIG. 2 is a target function, i.e., it shows the values of C/I to aim for in any situation. Iterations are needed to reach a final state on the curve because a change in transmission power influences C/I which in turn requires further adjustment of the transmission power. To regulate the power of a transmitting station, it is necessary to determine the parameters in the general relation. The transmitting station is then ordered in any suitable way by the receiving station to transmit at the desired transmission power level.

The constant G represents a predetermined acceptable power level at a particular distance. Specifically, $\alpha$ is adjusted so that a predefined distance interference dominates over noise in most of the links; at that power level, the system enjoys reasonable quality. The constant G affects only the average transmission power and not the capacity in an environment where interference dominates over the random noise level, i.e., in an interference-limited system. As one example, $\alpha$ may be set at the maximum acceptable interference level.

Good performance regarding system capacity can be obtained when the functions of the gain and interference are as follows:

$$B_g(g) = 0.7 \cdot g, \text{ and } B_i(i) = 0.7 \cdot i$$

Figure 3A:
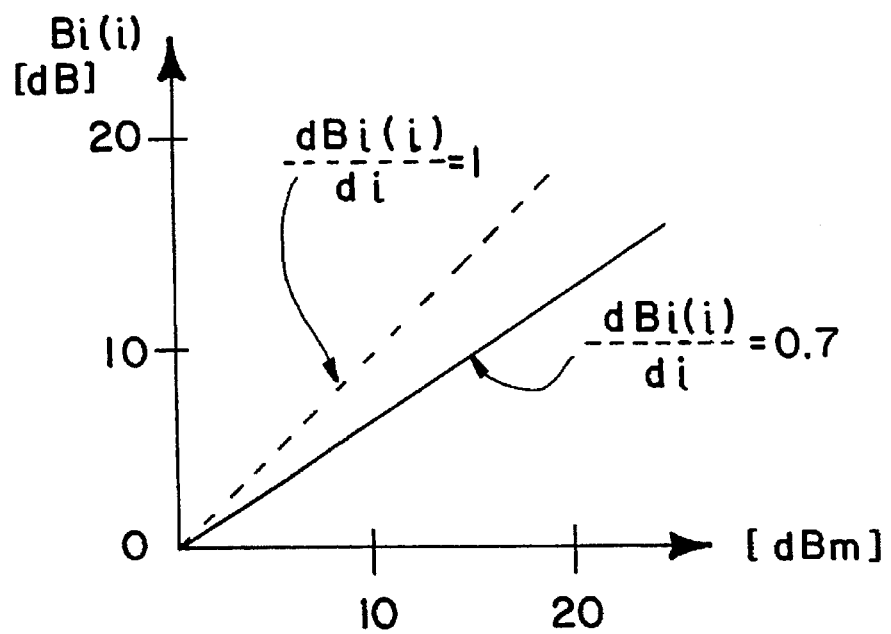
FIG. 3a is a graphical representation of a function of the interference power at the receiving station that may be employed in digital voice channel power regulation.
Figure 3B:
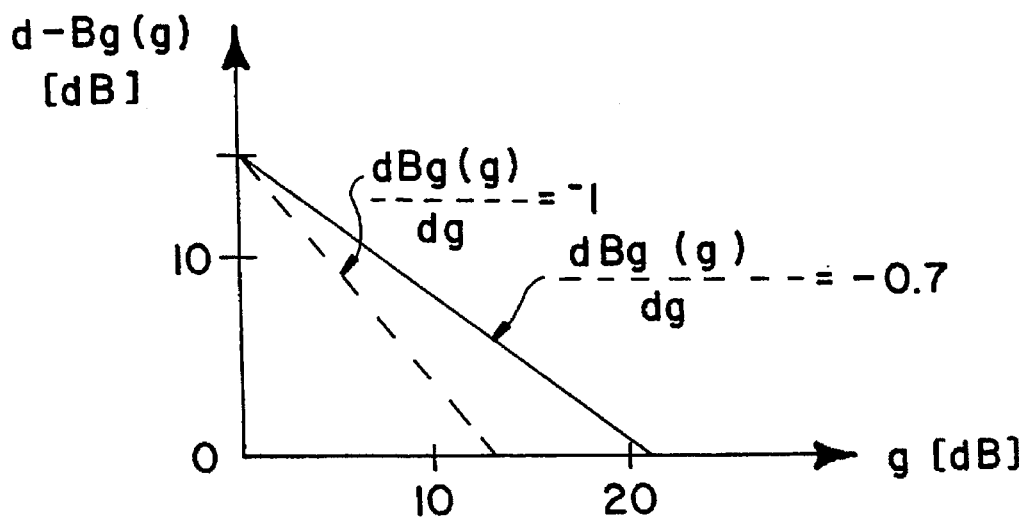
FIG. 3b is a graphical representation of a function of the path loss or gain in the link between the transmitter and receiver that may be employed in digital voice channel power regulation.

Other functions of g and i can be used, including nonlinear ones, but the slope of the function of i must be less than 1 for stability as noted above. The slope of the function of g is currently preferred to be between 0.5 and 1. Graphical representations of useful $B_i(i)$ and $B_g(g)$ are depicted in FIGS. 3a and 3b.

It will be seen from the foregoing general relation that a call suffering an increased interference level will be given a higher transmission power level but one associated with a C/I ratio less than the C/I ratio associated with the previous lower transmission power level. If it were otherwise, the problems of the prior systems where the transmitting stations transmit at the maximum allowable power level (the "party effect") would occur. Also, the transmission power level p will be decreased when the desired received signal strength is exceeded, for example, when a mobile station moves toward its base station (see FIG. 3b). As the path loss decreases and the gain increases, the system effectively moves to the right in FIG. 3b, thereby reducing the value of $\alpha - B_g(g)$, which results in a lower transmission power p at the next iteration.

The voice channel power regulation may be done in accordance with FIG. 2 which takes into account only the disturbance level. Thus, if the disturbance level does not change while a mobile station changes its distance from the base station, the transmission power level is changed such that the received C/I ratio does not change. In other words, full compensation is provided for gain changes (i.e., $dB_g/dg = 1$) but less than full compensation is provided for disturbance level changes (i.e., $dB_i/di < 1$).

Figure 4:
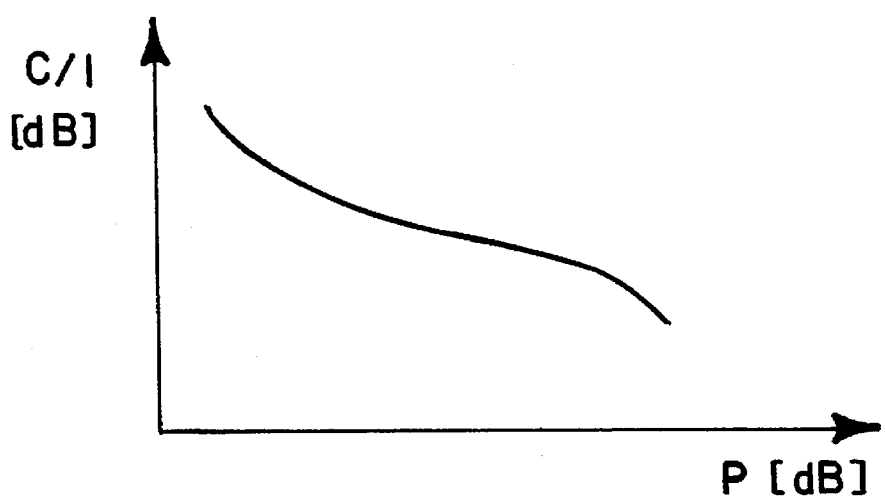
FIG. 4 is a graphical representation of another regulation function used in digital voice channel power regulation.

Alternatively, the voice channel power regulation may be done in accordance with FIG. 4, which shows the C/I target ratio as a monotonically decreasing function of the transmitted power level P and takes into account the present transmission power level. Power regulation using FIG. 4 is simpler than one using FIG. 2 because a determination of the value of the disturbance level i is unnecessary. On the other hand, power regulation using FIG. 4 provides less than full compensation not only for changes in disturbance level (which is necessary for stability) but also for changes in "radio distance" between the mobile and base stations (which is not necessary for stability). Because this is usually acceptable, power regulation in accordance with FIG. 4 may be preferred over power regulation in accordance with FIG. 2.

The foregoing general relation can be used iteratively to converge to the optimal transmission power level and to accommodate temporal variations in gain and/or interference level. It is currently preferred that the transmission power level be updated about every 0.5 second. In power regulation where $B_g(g)$ and $B_i(i)$ are linear as above, the transmission power for the next period, p', can be represented generally by the following scalar expression:

$$p' = \alpha - B \cdot ((\Delta \cdot g) - i)$$

where Δ is between 0 and 1, and B, which is the slope of both $B_g(g)$ and $B_i(i)$, is between 0 and 1 for stability. For Δ=1, this becomes $$p'=\alpha-B\cdot(g-i)$$

where the parameters α, p', g and i are conveniently in dB, as are the parameters p and C/I in the following expressions. However, since:

$$C/I=p+g-i$$

for a connection in an interference-limited system, then the next period's transmission power is given by the following expression of known parameters:

$$p'=\alpha-B\cdot(C/I-p)$$

where p is the current period's transmission power. When the system has achieved a steady state, i.e., when p'=p, then:

$$p=\alpha/(1-B)-(B/(1-B))\cdot C/I$$

from which the steady-state C/I and transmission power level when B=0.7 are given by the following expression:

$$p=\alpha/0.3-(0.7/0.3)\cdot C/I$$

where the C/I ratio is determined from a signal quality parameter, such as the BER as described above.

The transmission power level increases by 2.3 dB when the interference level increases by 1 dB. Other users experience increased interference, and act in the same way in response to the disturbance. After a period, the system settles to a steady-state in which the final decrease in C/I ratio is less than 1 dB because some of the increased interference has been compensated by the increased transmission powers. If the transmission power had been increased to reach the previous C/I ratio and the other users had done the same, transmission power would have increased progressively until the maximum was reached. On the other hand, if the transmission power had not been increased at all, the connection's C/I ratio would have decreased by 1 dB.

If the quality of some calls is to be reduced in a system, it preferably should be the quality of those calls causing interference rather than of calls suffering from it. A regulation curve for such a system is shown in FIG. 4 where the C/I target is a function of the transmission power used for the connection. For a given traffic situation in a system regulating voice channel power according to FIG. 4, the quality of calls at the border of a cell will likely be lower than the quality of calls at the cell interior. Also, the C/I ratio for calls in the interior of the cell for the power-regulated system is lower than the C/I ratio for such calls for an unregulated system, otherwise no improvement would be made. An advantage of voice channel power regulation according to FIG. 4 is its relatively easier implementation because the target C/I ratio depends only on the transmission power, which is known, and determination of the disturbance level i is not required.

Figure 5:
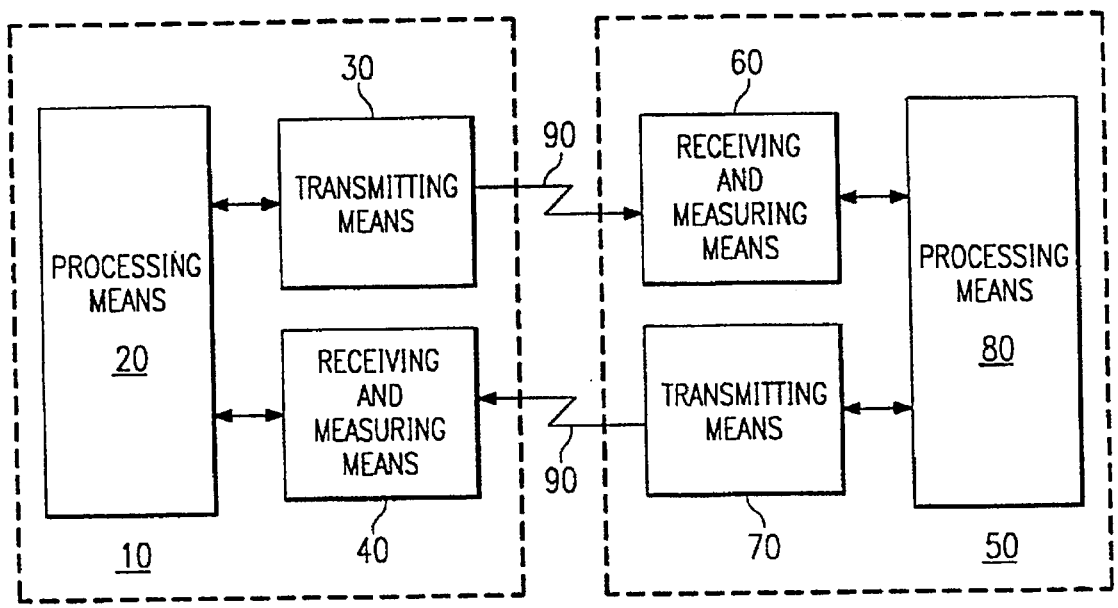
FIG. 5 is a block diagram of an exemplary system for performing digital voice channel power regulation.

A system using digital voice channel power regulation is illustrated in FIG. 5. This system is similar to the system disclosed in commonly assigned U.S. patent application Ser. No. 941,307, filed Sep. 4, 1992 now abandoned, which is herein incorporated by reference. This system could be implemented into the system shown in FIG. 1, with, for example, block 10 of FIG. 5 implemented in one of the mobile stations M1–M10 and block 50 of FIG. 5 implemented in one of the base stations B1–B10. The mobile station 10 has a means 30 for transmitting radio signals to a base station 50 that has a means 60 for receiving the radio signals and measuring their power level. The base station 50 has a means 70 for transmitting radio signals to the mobile station 10 that has a means 40 for receiving the radio signals and measuring their power level. The receiving and measuring means 60, 40 also determine the channel path loss or gain and the quality of the received signals, including the C/I ratio, as described above. A method of measuring the interference level i during periods of silence is disclosed in commonly assigned U.S. patent application Ser. No. 691, 221, filed Apr. 25, 1991 now U.S. Pat. No. 5,355,514, which is herein incorporated by reference.

When the mobile station digital voice channel power is to be regulated, suitable data signals reflecting the received signal strength and quality measurements are provided by the receiving means 60 to a signal processor 80, which determines the new voice channel transmission power level or new C/I target value in a manner described above. The processor 80 then provides a suitable command signal to a transmitter 70 in the base station 50; the transmitter 70 sends the command signal to the mobile station 10, ordering the mobile station 10 to transmit at the new voice channel transmission power level associated with the new C/I target value. A means 40 for receiving the order forwards the order to a suitable processor 20, which causes the transmitting means 30 to transmit at the new transmission power level associated with the new C/I target value. Regulation of the voice channel transmission power of the base station 50, is done in a analogous manner with the functions performed by the equivalent means blocks of the base and mobile stations interchanged.

FIG. 6 is a table which illustrates the channel types and the method of power control used for each channel type in a IS-54-B system using digital voice channel power regulation.

The preferred embodiment of the present invention involves implementation into the IS-54-B system of a method of comparing all fixed, manually set power levels shown in FIG. 6 with maximum values of the power levels set by power transmission regulation on automatically set channels, such as the digital voice channel. The information obtained from these comparisons is then used by the system operators to make decisions on manually adjusting the power levels on the other channels. Alternatively, the information is used by the system to automatically adjust the power levels on the other channels.

Figure 7:
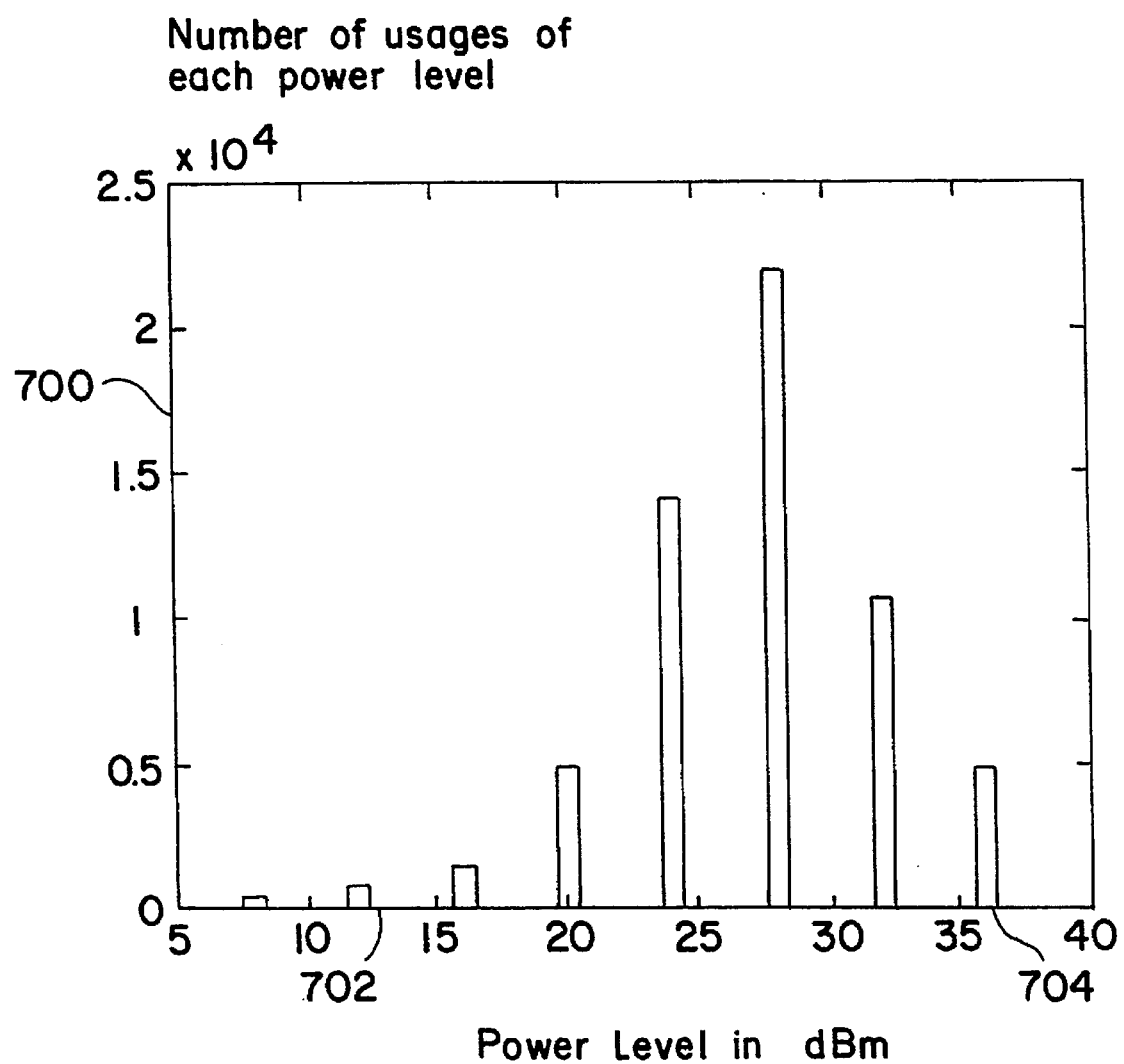
FIG. 7 is a histogram illustrating the number of usages of each base station output power level versus power levels for voice channels sampled at a set interval over a set period of time.

In the present invention, the maximum base station power level set for all regulated base station digital voice channels, after a reasonably long time period, is considered as a true maximum power level (TMax) for the base station. FIG. 7 is a histogram illustrating the number of usages of each output power level versus power levels for base station regulated digital voice channels sampled at a set interval over a set period of time. In FIG. 7 the number of usages is shown on the y-axis 700 and the power levels are shown on the x-axis 702. Possible time values for the sampling could be 5 minute intervals over a 48 hour period. The TMax value is determined by taking the real maximum power level used over the period. In the sampling shown in FIG. 7, TMax 704 would have a value of 36 dBm.

Figure 8:
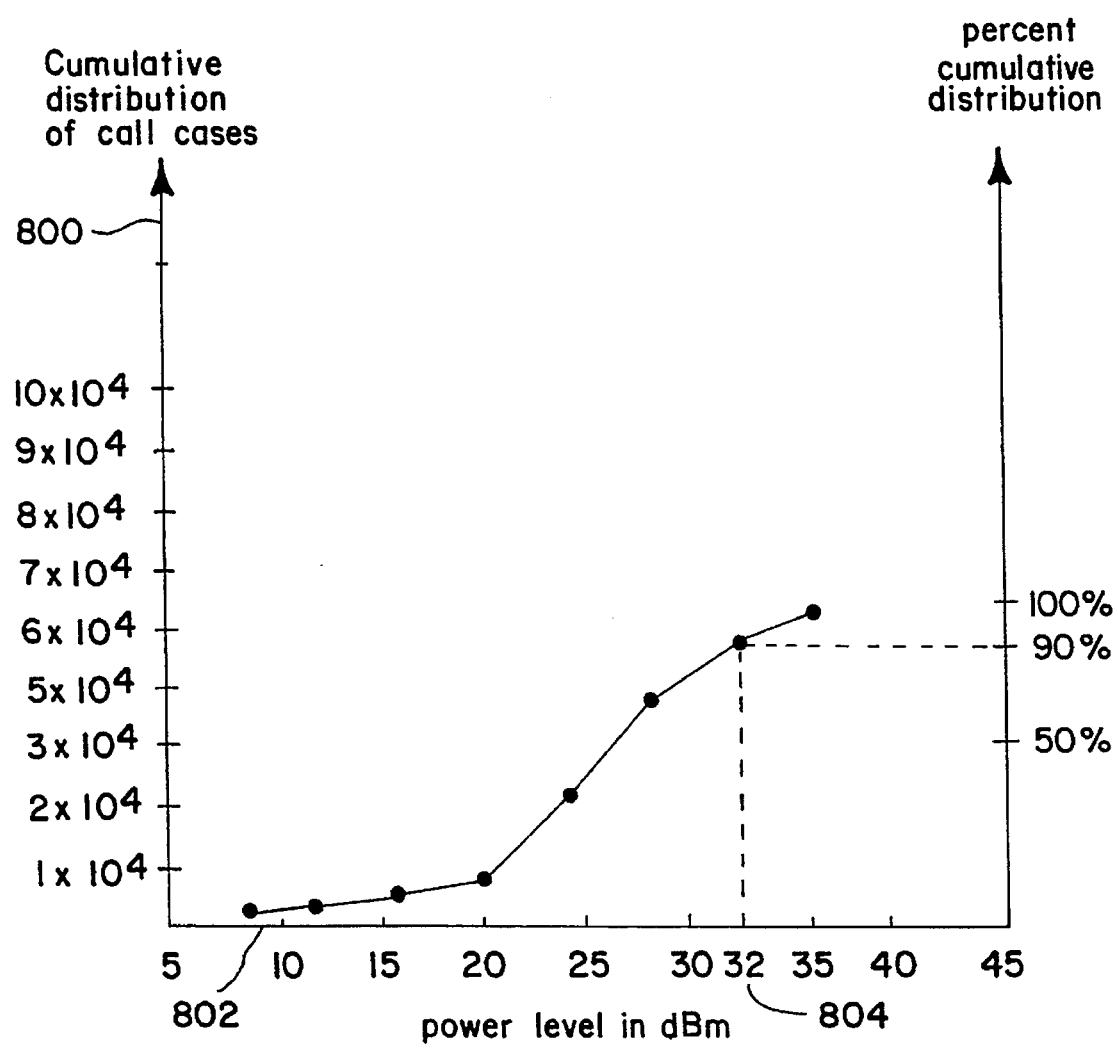
FIG. 8 is a plot of the cumulative number of usages at or below each base station digital voice channel power level versus base station power level taken from the data shown in FIG. 7.

Alternatively, the system of the recent invention collects data on the distribution of power levels for the regulated digital voice channels. After a sufficiently long period of time the system selects a value that is equal to or greater than the regulated digital voice channel base station power level for a given percentage of time. This value is called virtual maximum power level (Vmax) for the base station. FIG. 8 is a plot of the cumulative number of usages at or below each base station power level versus base station power level taken from the sampling data shown in FIG. 7. In FIG. 8 the cumulative number of usages is shown on the y-axis 800 and the power levels are shown on the x-axis 802. A VMax value is determined by finding the power level which is equal to or greater than the power level used for a set percentage of the usages sampled. A possible value would be ninety percent. Using ninety percent, in FIG. 8, VMax 804 is equal to 32 dBm. The chosen percentage value must be high in order to account for most mobile stations within the coverage area of the base station.

In one embodiment of the invention these functions are implemented within the various functional blocks of the system shown in FIG. 5. In such an implementation, base station digital voice channel transmission power levels sent by command signals from the mobile stations such as mobile station 10 operating in the coverage area of a base station 50 are saved in a memory of processing means 80 and sampled at each sampling interval. The power level samples for each interval are then saved in a separate memory of processing means 80. In a typical system there is more than one mobile station equivalent to mobile station 10 from which new base station digital voice channel transmission power levels are sent. The base station 50 transmits to each of these mobile stations on a separate digital voice channel. The values of TMax and VMax for the base station digital voice channels of a base station 50 are determined in the processing means 80 at the end of each sampling period from the samples in memory. Timers for the sampling intervals and periods are contained within the processing means. As an alternative, the complete set of all new digital voice channel transmission power levels could be used to determine TMax and VMax at the end of the appropriate sampling period.

Figure 9:
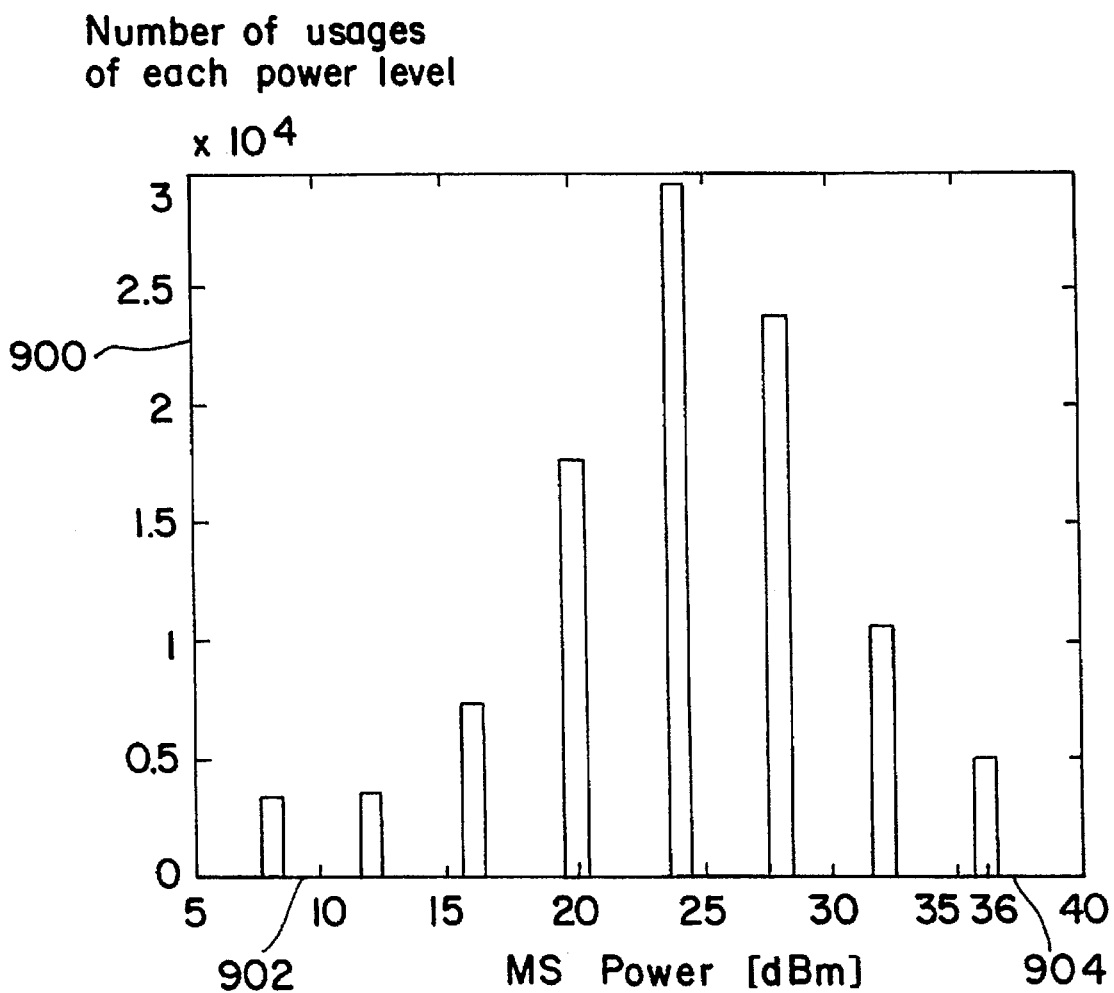
FIG. 9 is a histogram illustrating the number of usages of each mobile station digital voice channel output power level versus output power levels for voice channels sampled at a set interval over a set period of time.

In an analogous manner, TMax or VMax is also determined for the mobile stations within a base station's coverage area. FIG. 9 is a histogram illustrating the number of usages of each mobile station regulated channel output power level versus output power levels for regulated voice channels sampled at a set interval over a set period of time. In FIG. 9 the number of usages is shown on the y-axis 900 and the mobile station power levels are shown on the x-axis 902. Possible time values for the sampling could be 5 minute intervals over a 48 hour period. The TMax value is determined by taking the maximum power level used over the period. In the sampling shown in FIG. 9, TMax 904 would have a value of 36 dBm.

Figure 10:
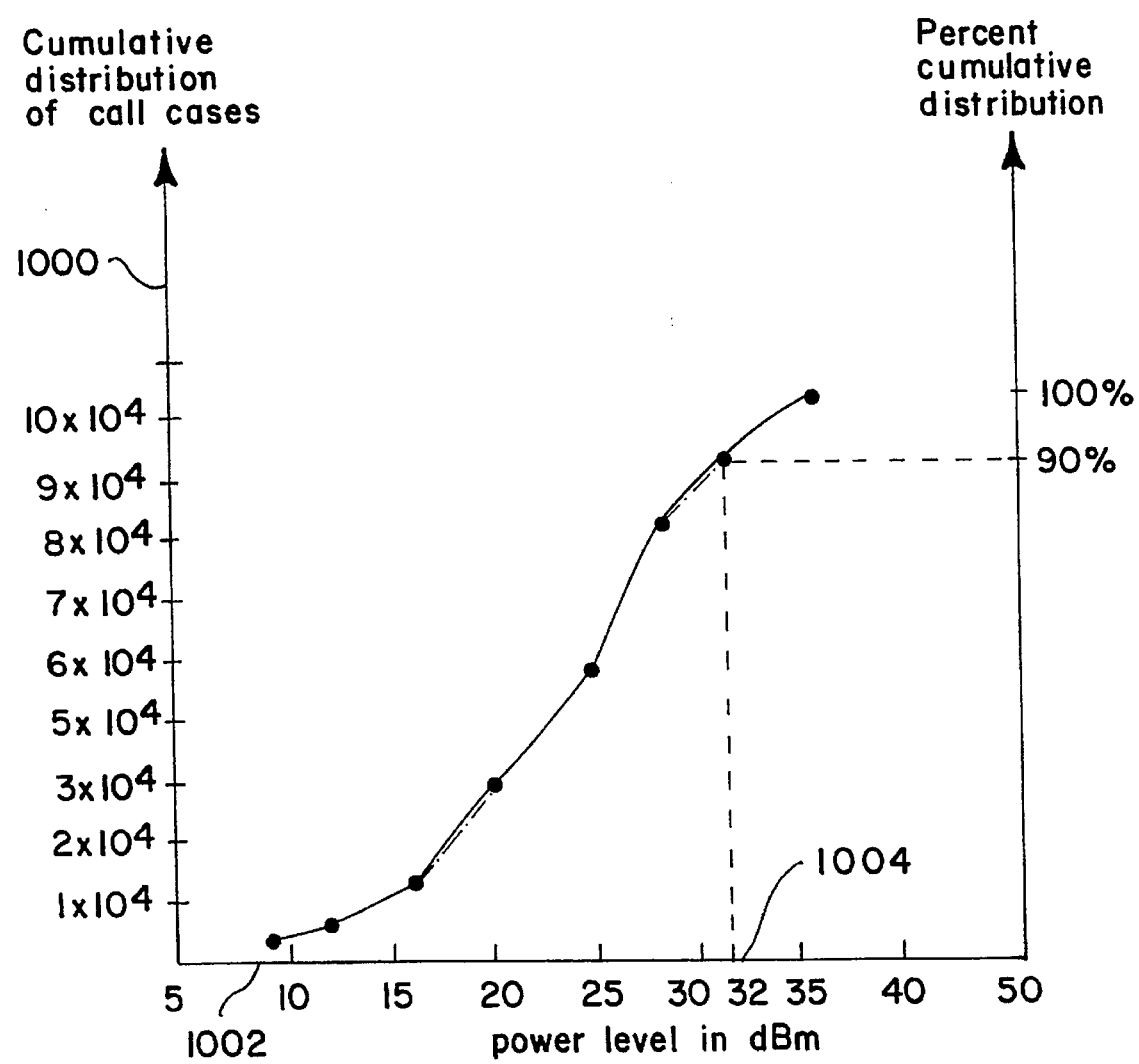
FIG. 10 is a plot of the cumulative number of usages at or below each mobile station digital voice channel power level versus mobile station power level taken from the data shown in FIG. 9.

FIG. 10 is a plot of the cumulative number of usages at or below each mobile station power level versus mobile station power level taken from the sampling data shown in FIG. 9. In FIG. 10 the cumulative number of usages is shown on the y-axis 1000 and the power levels are shown on the x-axis 1002. VMax is determined by finding the power level which is equal to or greater than the power level used for a set percentage of the usages sampled. A possible value would be 90 percent. Using 90 percent in FIG. 10 VMax 1004 is equal to 32 dBm.

These functions are also implemented within the various functional blocks of the system shown in FIG. 5. As the base station 50 performs the digital voice channel power regulation, all new digital voice channel transmission power levels sent to mobile stations, such as mobile station 10, by command signal are saved in a memory contained in processing means 80 and sampled at each sampling interval. Each sample is saved in a separate section of memory. In a typical system there are more than one mobile station equivalent to mobile station 10, each transmitting to the base station 50 on a separate digital voice channel, to which new mobile station digital voice channel transmission power level commands are sent. Timers for the sampling intervals and periods are contained within the processing means. The values of TMax and VMax, for the mobile stations within the coverage area of base station 50 are determined in the processing means 80 of the base station 50 at the end of the appropriate sampling period from the saved samples. As an alternative, the complete set of all new digital voice channel transmission power levels could be used to determine TMax and VMax at the end of the appropriate sampling period.

After determining a TMax or VMax value, the system then makes several comparisons. The TMax or VMax digital voice channel output power set for a base station is compared against the operator-defined output power level values for the fixed radio channels transmitted by the base station, including the operator-defined base analog voice channel level (OBAVC), the operator-defined base analog control channel level (OBACC), and the operator-defined base digital control channel level (OBDCC). The TMax or VMax base station digital voice channel output power is also compared against the operator-defined base maximum power level that must not be exceeded by Base Station digital voice channel Power Regulation for that base station (OBMAX). The system also compares the TMax or VMax digital voice channel mobile station output power set by Mobile Station Power Regulation against, first, the operator-defined output power levels for the fixed power radio channel transmitted by the mobile station within the coverage of the base station, including the operator-defined mobile analog control channel level (OMACC) and the operator-defined mobile digital control channel level (OMDCC); second, the operator-defined initial power levels for voice channels transmitted by the mobile stations within the coverage of the base station, including the operator-defined initial mobile analog voice channel level (OIAVC) and the operator-defined initial mobile digital voice channel level (OIDVC); and third, the operator-defined mobile maximum power level (OMMAX) that must not be exceeded by digital voice channel power regulation for mobile stations within the coverage of the base station.

The aforementioned comparisons are performed by software within processing means 80 of FIG. 5. The system automatically provides reports to the operator if any discrepancies arise from the above mentioned comparisons. Depending on the implementation choice, a discrepancy can be defined as any measurable difference between the compared parameters. On the other hand, it can also be defined as a difference that exceeds a predefined margin. The reports to the operator may be expressed in several forms such as alarms, printouts or graphical displays. Processing means 80 of the base station 50 could also send appropriate command signals to transmitting means 70 to transmit the results to be displayed to the mobile station operator. The operator may then use the reported information to manually set power levels so that no discrepancies exist.

Figure 11:
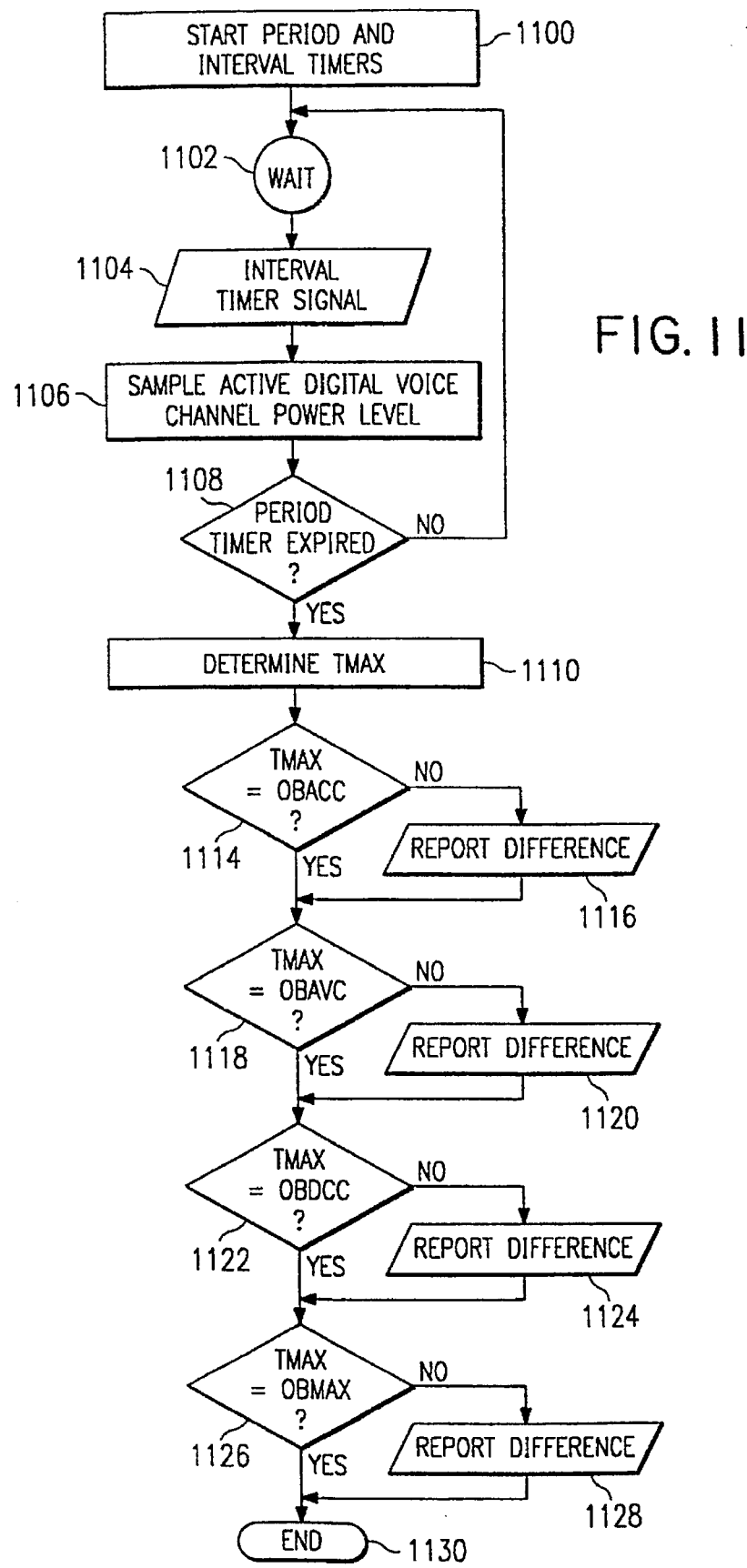
FIG. 11 is a flow chart illustrating the functions performed in accordance with the invention when utilizing a true maximum output power value for a base station.

FIG. 11 is a flow chart illustrating the functions performed in accordance with the invention when utilizing a TMax output power value for a Base Station using digital voice channel power regulation. The TMax determination process begins at Step 1100 where the sampling period and sampling interval timers are started. The process will sample power levels at intervals set by the interval timer over a period set by the sampling period timer. The process then moves to Step 1102 and waits for a signal from the sampling interval timer. The signal from the sampling interval timer is received at Step 1104. From Step 1104 the process moves to Step 1106 and samples and saves the values of power levels being used on all active voice channels of the base station. The process then moves to Step 1108 to determine if the sampling period has expired. If the sampling period has not expired the process returns to Step 1102 and waits for another sampling interval timer signal. If however, at Step 1108, the sampling period has been found to have expired, the process moves to Step 1110 and a value of TMax is determined. From Step 1110 the process moves to Step 1114 and the process then begins comparing the TMax value with power values for the various base station transmission channels.

At Step 1114 TMax is compared with OBACC. If, at Step 1114, OBACC and TMax are found to be equal, the 5 process moves to Step 1118. If, however, at Step 1114, OBACC and TMax are found to not be equal the process moves to Step 1116 where the difference in the two values is reported to the system operator. The process then moves from Step 1116 to Step 1118.

At Step 1118 TMax is compared with OBAVC. If, at Step 1118, OBAVC and TMax are found to be equal the process moves to Step 1122. If, however, at Step 1118, OBAVC and TMax are determined to not be equal, the process moves to Step 1120 where the difference in the two values is reported to the system operator. The process then moves from Step 1120 to Step 1122.

At Step 1122 TMax is compared with OBDCC. If, at Step 1122, OBDCC and TMax are determined to be equal the process moves to Step 1126. If, however, at Step 1122, OBDCC and TMax are determined to not be equal the process moves to Step 1124 where the difference in the two values is reported to the system operator. The process then moves from Step 1124 to Step 1126.

Figure 12:
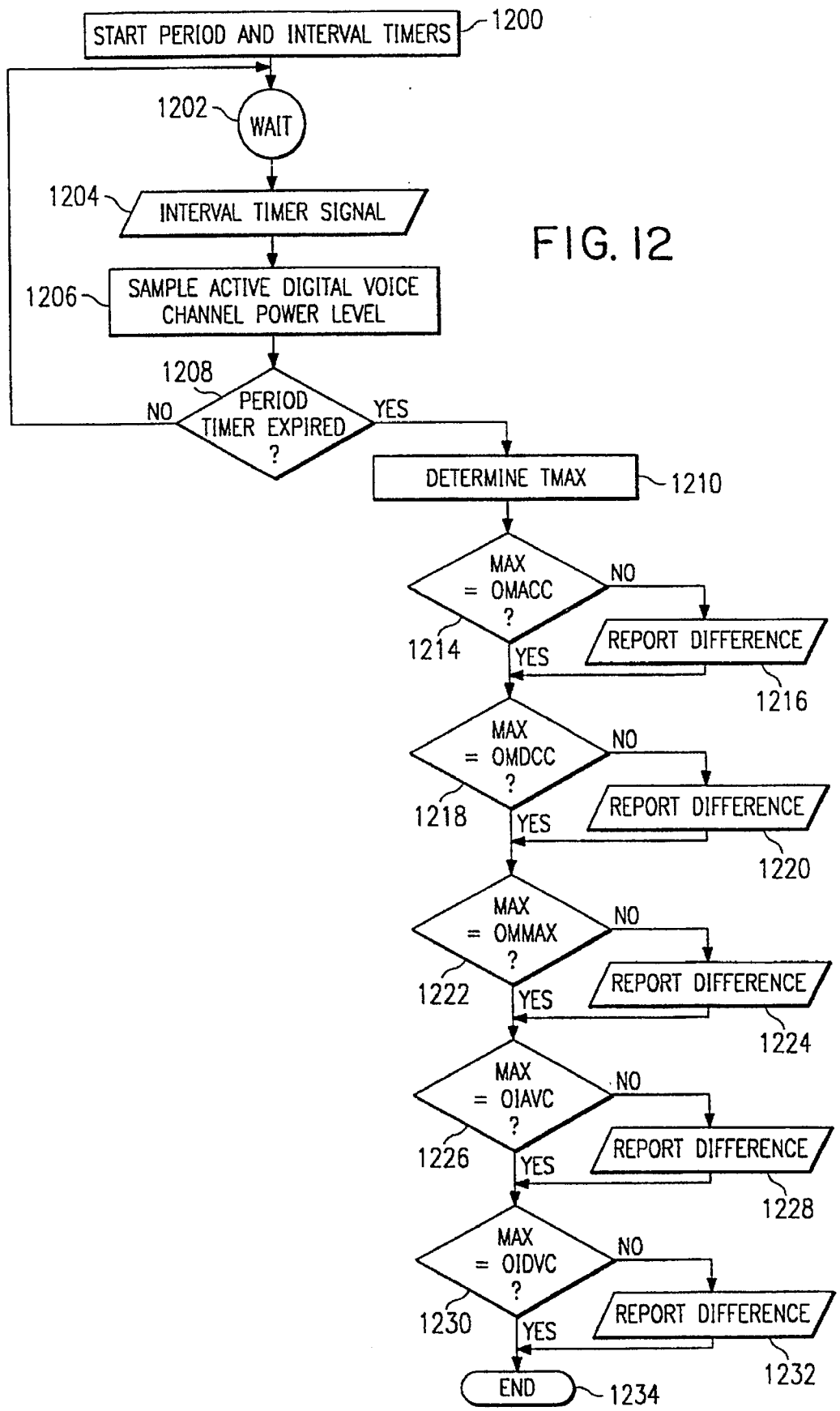
FIG. 12 is a flow chart illustrating the functions performed in accordance with the invention when utilizing a true maximum output power value for a mobile station.

At Step 1126 TMax is compared with OBMax. If, at Step 1126 OBMax and TMax are determined to be equal the process moves to Step 1130 where the process ends. If, however, at Step 1126, OBMax and TMax are determined to not be equal the process moves to Step 1128. At Step 1128 the difference in the two values is reported to the system operator. The process then moves from Step 1128 to Step 1130 where the process ends. The system operator may now use any reported differences to adjust output power levels on the appropriate base station channels. FIG. 12 is a flow chart illustrating the functions performed in accordance with the cellular system when utilizing a TMax output power value for Mobile Stations operating within the area of a base station using digital voice channel power regulation. The TMax determination process begins at Step 1200 where the sampling period and sampling interval timers are started. The process then moves to Step 1202 and waits for a signal from the sampling interval timer. The signal from the sampling interval timer is received at 1204. From step 1204 the process moves to Step 1206 and samples and saves the values of power levels being used on all active voice channels of mobile stations within the area of the base station. The process then moves to step 1208 to determine if the sampling period timer has expired. If the sampling period timer has not expired the process returns to Step 1202 and waits for another sampling timer signal. If however, at Step 1208, the sampling period has been found to have expired, the process moves to Step 1210 and a value of TMax is determined. From Step 1210 the process moves to Step 1214 and the process then begins comparing the TMax value with power values for the various mobile station channels for mobile stations within the area of the base station. At Step 1214 TMax is compared with OMACC. If, at Step 1214, OMACC and TMax are found to be equal the process moves to Step 1218. If, however, at Step 1214, OMACC and TMax are found to not be equal the process moves to Step 1216 where the difference in the two values is reported to the system operator. The process then moves from Step 1216 to Step 1218.

At Step 1218 TMax is compared with OMDCC. If, at Step 1218, OMDCC and TMax are found to be equal the process moves to Step 1222. If, however, at Step 1218, OMDCC and TMax are determined to not be equal, the process moves to Step 1220 where the difference in the two values is reported to the system operator. The process then moves from Step 1220 to Step 1222.

At Step 1222 TMax is compared with OMMax. If, at Step 1222, OMMAX and TMax are determined to be equal the process moves to Step 1226. If, however, at Step 232, OMMax and TMax are determined to not be equal the process moves to Step 1224 where the difference in the two values is reported to the system operator. The process then moves from Step 1224 to Step 1226.

At Step 1226 TMax is compared with OIAVC. If, at Step 1226 OIAVC and TMax are determined to be equal the process moves to Step 1230 where the process ends. If, however, at Step 1226, OIAVC and TMax are determined to not be equal the process moves to Step 1228. At Step 1228 the difference in the two values is reported to the system operator. The process then moves from Step 238 to Step 1230. At Step 1230 TMax is compared to OIDVC. If, at Step 1230 OIDVC and TMax are determined to be equal the process moves to Step 1234 where the process ends. If, however, at Step 1230, OIDVC and TMax are determined to not be equal the process moves to Step 1232. At Step 1232 the difference in the two values is reported to the system operator. The process then moves from Step 1232 to Step 1234 where the process ends. The system operator may now use any reported differences to adjust output power levels on the appropriate mobile station channels by having appropriate command sent to mobile stations with the coverage area of the base station.

Figure 13:
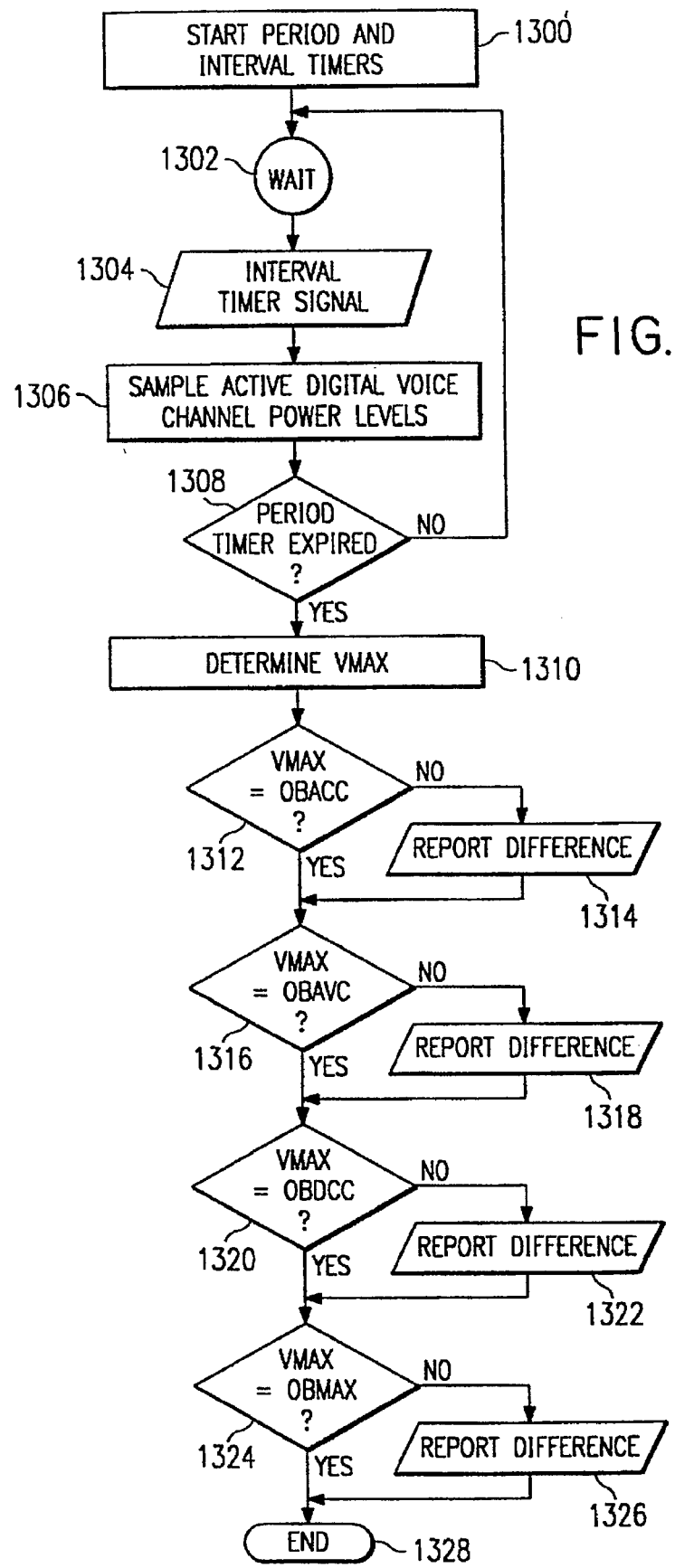
FIG. 13 is a flow chart illustrating the functions performed in accordance with the invention when utilizing a virtual maximum output power value for a base station.

FIG. 13 is a flow chart illustrating the functions performed in accordance with the cellular system when utilizing a VMax output power value for a Base Station using digital voice channel power regulation. The VMax determination process begins at Step 1300 where the sampling and sampling interval timers are started. The process then moves to Step 1302 and waits for a signal from the sampling interval timer. The signal from the sampling interval timer is received at 1304. From step 1304 the process moves to Step 1306 and samples and saves the values of power levels being used on all active digital voice channels of the base station. The process then moves to step 1308 to determine if the sampling period timer has expired. If the sampling period has not expired the process returns to Step 1302 and waits for another sampling interval timer signal. If however, at Step 1308, the sampling period has been found to have expired, the process moves to Step 1310 and a value of VMax is determined. From Step 1310 the process moves to Step 1312 and the process then begins comparing the VMax value with power values for the various base station transmission channels. At Step 1312 VMax is compared with OBACC. If, at Step 1312, VMax and OBACC are determined to be equal the process moves to Step 1316. If, however, at Step 1312, OBACC and VMax are determined to not be equal the process moves to Step 1314 where the difference in the two values is reported to the system operator. The process then moves from Step 1314 to Step 1316.

At Step 1316 VMax is compared with OBAVC. If, at Step 1316, VMax and OBAVC are determined to be equal the process moves to Step 1320. If, however, at Step 1316, OBACC and VMax are determined not to be equal the process moves to Step 1318 where the difference in the two values is reported to the system operator. The process then moves from Step 1318 to Step 1320.

At Step 1320 VMax is compared with OBDCC. If, at Step 1320, VMax and OBDCC are determined to be equal the process moves to Step 1316. If, however, at Step 1320 OBDCC and VMax are determined not to be equal the process moves to Step 1322 where the difference between the two values is reported to the system operator. The process then moves from Step 1322 to Step 1324.

At Step 1324 VMax is compared with OBMAX. If, at Step 1324, it is determined that VMax and OBMAX are equal the process moves to Step 1328 where the process ends. If, however, at Step 1324 it is determined that OBMAX and VMax are not equal the process moves to Step 1326 where the difference in the two values is reported to the system operator. The process then moves from Step 1326 to Step 1328 where the process ends. The system operator may now use any reported differences to adjust output power levels on the appropriate base station channels.

Figure 14:
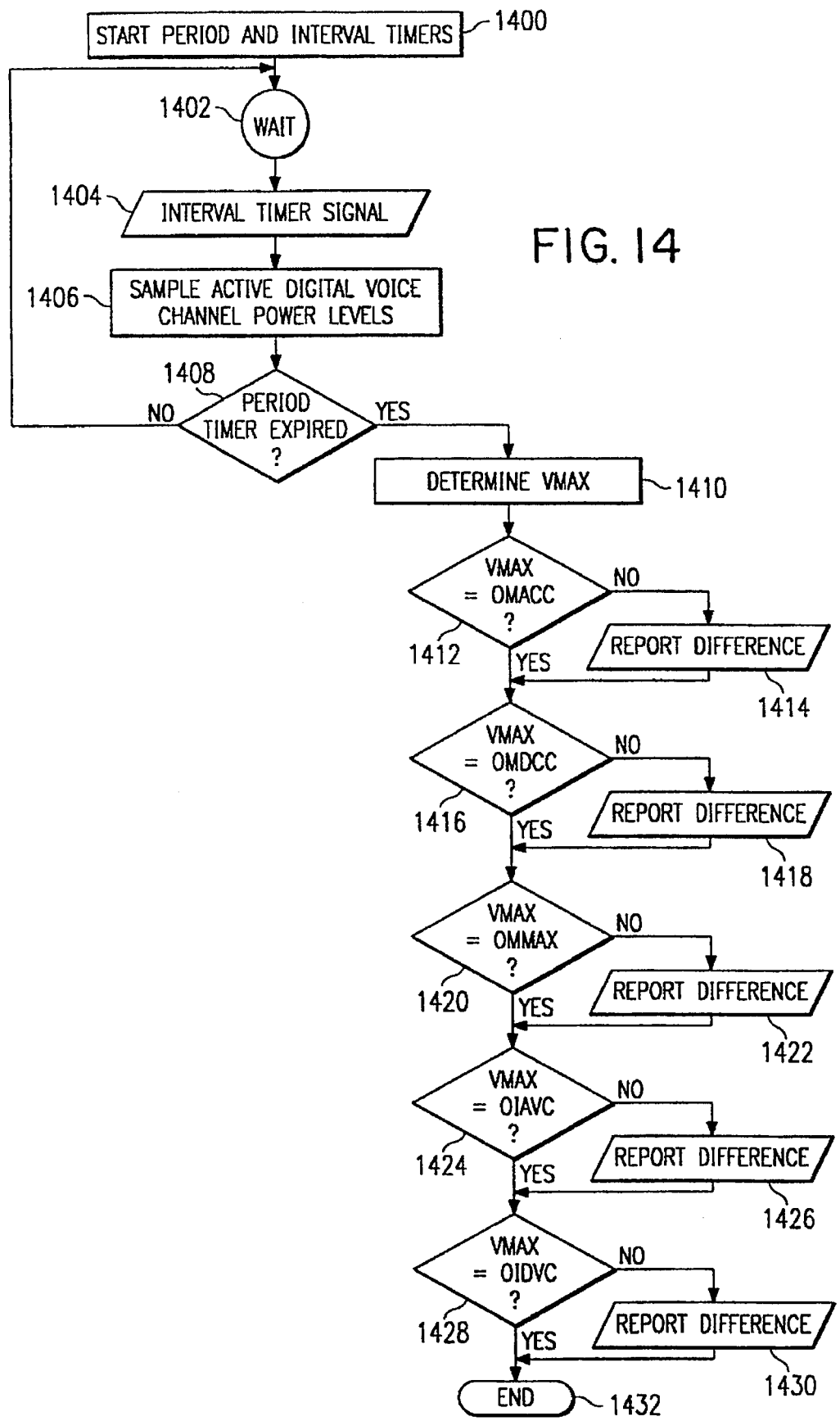
FIG. 14 is a flow chart illustrating the functions performed in accordance with the invention when utilizing a virtual maximum output power value for a mobile station.

FIG. 14 is a flow chart illustrating the functions performed in accordance with the invention when utilizing a VMax output power value for a Mobile Station using digital voice power regulation. The VMax determination process begins at Step 1400 where the sampling and sampling interval timers are started. The process then moves to Step 1402 and waits for an signal from the sampling interval timer. The signal from the sampling interval timer is received at Step 1404. From step 1404 the process moves to Step 1406 and samples and saves the values of power levels being used on all active voice channel of the mobiles within the area of a base station. The process then moves to Step 1408 to determine if the sampling period timer has expired. If the sampling period timer has not expired the process returns to Step 1402 and waits for another sampling interval timer signal. If however, at Step 1408, the sampling period timer has been found to have expired, the process moves to Step 1410 and a value of VMax is determined. From Step 1410 the process moves to Step 1412 and the process then begins comparing the VMax value with power values for the various base station transmission channels for mobile stations operating within the area of the base station. At Step 1412 VMax is compared with OMACC. If, at Step 1412, VMax and OMACC are determined to be equal the process moves to Step 1416. If, however, at Step 1412, OMACC and VMax are determined to not be equal the process moves to Step 1414 where the difference in the two values is reported to the system operator. The process then moves from Step 1414 to Step 1416.

At Step 1416 VMax is compared with OMDCC. If, at Step 1416, VMax and OMDCC are determined to be equal the process moves to Step 1420. If, however, at Step 1416, OMDCC and VMax are determined not to be equal the process moves to Step 1418 where the difference in the two values is reported to the system operator. The process then moves from Step 1418 to Step 1420.

At Step 1420 VMax is compared with OMMAX. If, at Step 1420, VMax and OMMAX are determined to be equal the process moves to Step 1416. If, however, at Step 1420 OMMAX and VMax are determined not to be equal the process moves to Step 1422 where the difference between the two values is reported to the system operator. The process then moves from Step 1422 to Step 1424.

At Step 1424 VMax is compared with OIAVC. If, at Step 1424, it is determined that VMax and OIAVC are equal the process moves to Step 1428. If, however, at Step 1424 it is determined that OIAVC and VMax are not equal the process moves to Step 1426 where the difference in the two values is reported to the system operator. The process then moves from Step 1426 to Step 1428.

At Step 1428 VMax is compared with OIDVC. If, at Step 1428, it is determined that VMax and OIDVC are equal the process moves to Step 1432, where the process ends. If, however, at Step 1428 it is determined that OIDVC and VMax are not equal the process moves to Step 1430 where the difference in the two values is reported to the system operator. The process then moves from Step 1430 to Step 1432, where the process ends.

In another embodiment of the invention, the system can automatically adjust the operator-defined power levels based on the aforementioned comparisons. These parameters for the mobile station and the base station can be set equal to the TMax or the VMax power levels computed from digital voice channel power regulation. As an option, there could be some compensation on the TMax or VMax power value prior to the automated setting of the power level parameters. A preferred implementation would be to use the TMax value to set the maximum power levels that must not be exceeded by digital voice channel power regulation, and to use the VMax value for the other power level parameters.

One implementation is in the mobile station 10 and base station 50 of FIG. 5. After software within the processing means 80 reports that there is a discrepancy in the comparison between the regulated and unregulated channels, commands are sent from the processing means 80 to the transmitting means 70, to set the base station 50 output power levels to TMax or VMax after these values are determined in processing means 80. Processing means 80 could also provide a command signal to transmitting means 70 to send a command signal to the mobile station 10 commanding the mobile station to change its transmission levels on unregulated channels to the appropriate value, TMax or VMax.

Figure 15:
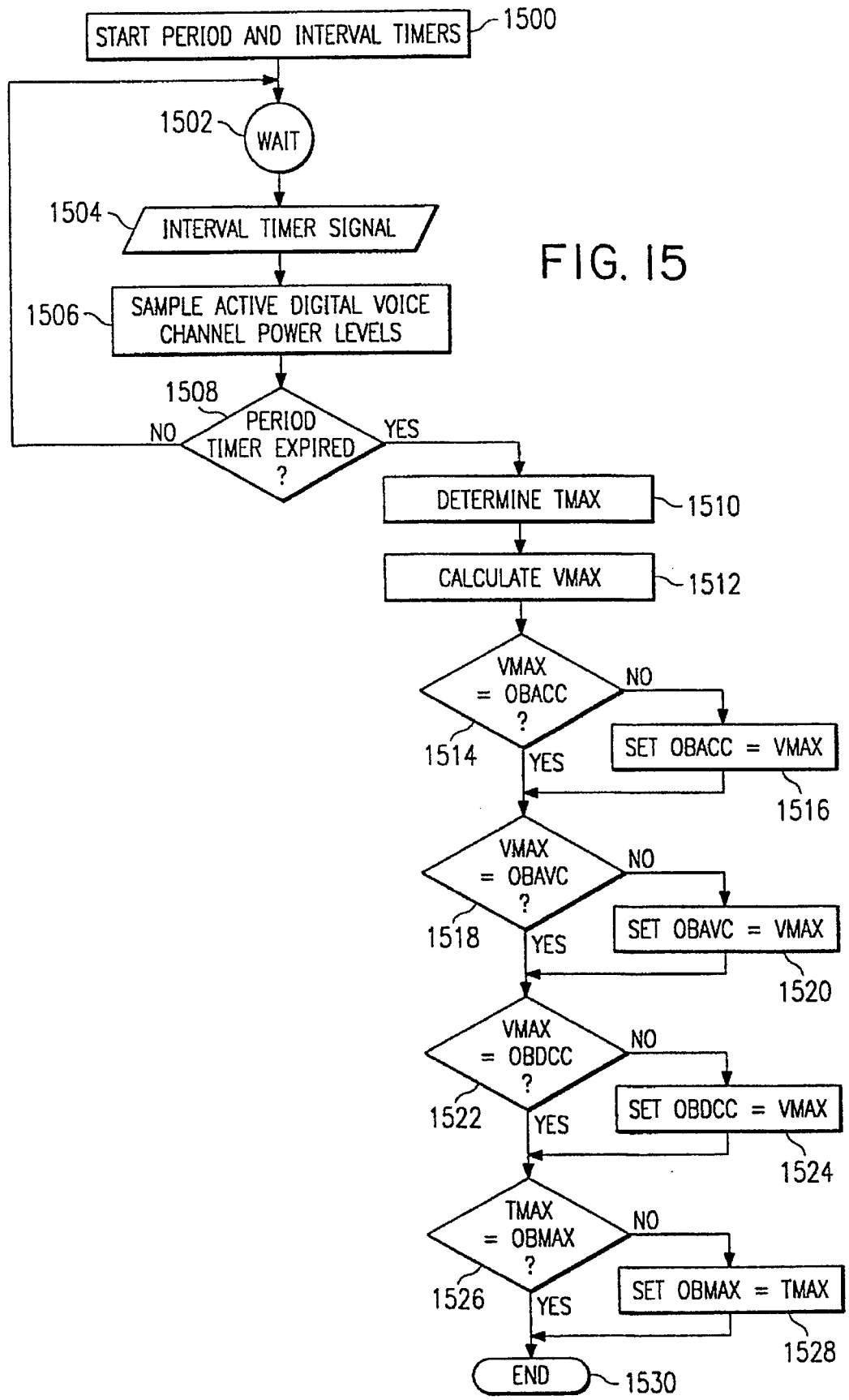
FIG. 15 is a flow chart illustrating the functions performed in accordance with the invention when automatically setting output power values for a base station.

FIG. 15 is a flow chart illustrating the functions performed in accordance with the invention when setting output power values for a base station in a system using digital voice channel power regulation. The process begins at Step 1500 where the sampling period and sampling interval timers are started. From Step 1500 the process moves to Step 1502 and waits for a sampling signal from the sampling interval timer. When a sampling signal is received the process moves from Step 1504 to Step 1506 where the voice channels in use by the base station are sampled. The process then moves from Step 1506 to Step 1508. At Step 1508 it is determined if the sampling timer period has expired. If, at Step 1508, it is found that the sampling period timer has not expired, the process moves back to Step 1502 and waits for another sampling timer signal. If, however, at Step 1508, it is found that the sampling period timer has expired, the process moves from Step 1508 to Step 1510.

At Step 1510 the process determines TMax from the sampled power levels. From Step 1510 the process moves to Step 1512. At Step 1512 VMax is calculated from the sampled values. The process then moves from Step 1512 to Step 1514 where VMax and OBACC are compared. If, at 1514, it is determined that VMax and OBACC are not equal, the process moves from Step 1514 to Step 1516 and at Step 1516 sets OBACC to the value of VMax. The process then moves from Step 1516 to Step 1518. If, however at Step 1514, it is determined that VMax is equal to OBACC the process will move directly from Step 1514 to Step 1518.

At Step 1518 VMax and OBAVC are compared. If, at Step 1518, it is determined that VMax and OBAVC are not equal the process moves from Step 1518 to Step 1520, and at Step 1520 sets OBAVC to the value of VMax. The process then moves from Step 1520 to Step 1522. If, however at Step 1518, it is determined that VMax and OBAVC are equal the process will move directly from Step 1518 to Step 1522.

At Step 1522 VMax and OBDCC are compared. If, at Step 1522, it is determined that VMax and OBDCC are not equal the process moves from Step 1522 to Step 1524, and at Step 1524 sets OBDCC to the value of VMax. The process then moves from Step 1524 to Step 1526. If, however at Step 1522, it is determined that VMax and OBDCC are equal the process will move directly from Step 1526 to Step 1526.

At Step 1526 TMax and OBMax are compared. If, at Step 1526, it is determined that TMax and OBMax are not equal the process moves from Step 1526 to Step 1528, and at Step 1528 sets OBMax to the value of TMax. The process then moves from Step 1528 to Step 1530 where the process ends. If, however at Step 1526, it is determined that TMax and OBMax are equal the process will move directly from Step 1526 to Step 1530 where the process ends.

Figure 16:
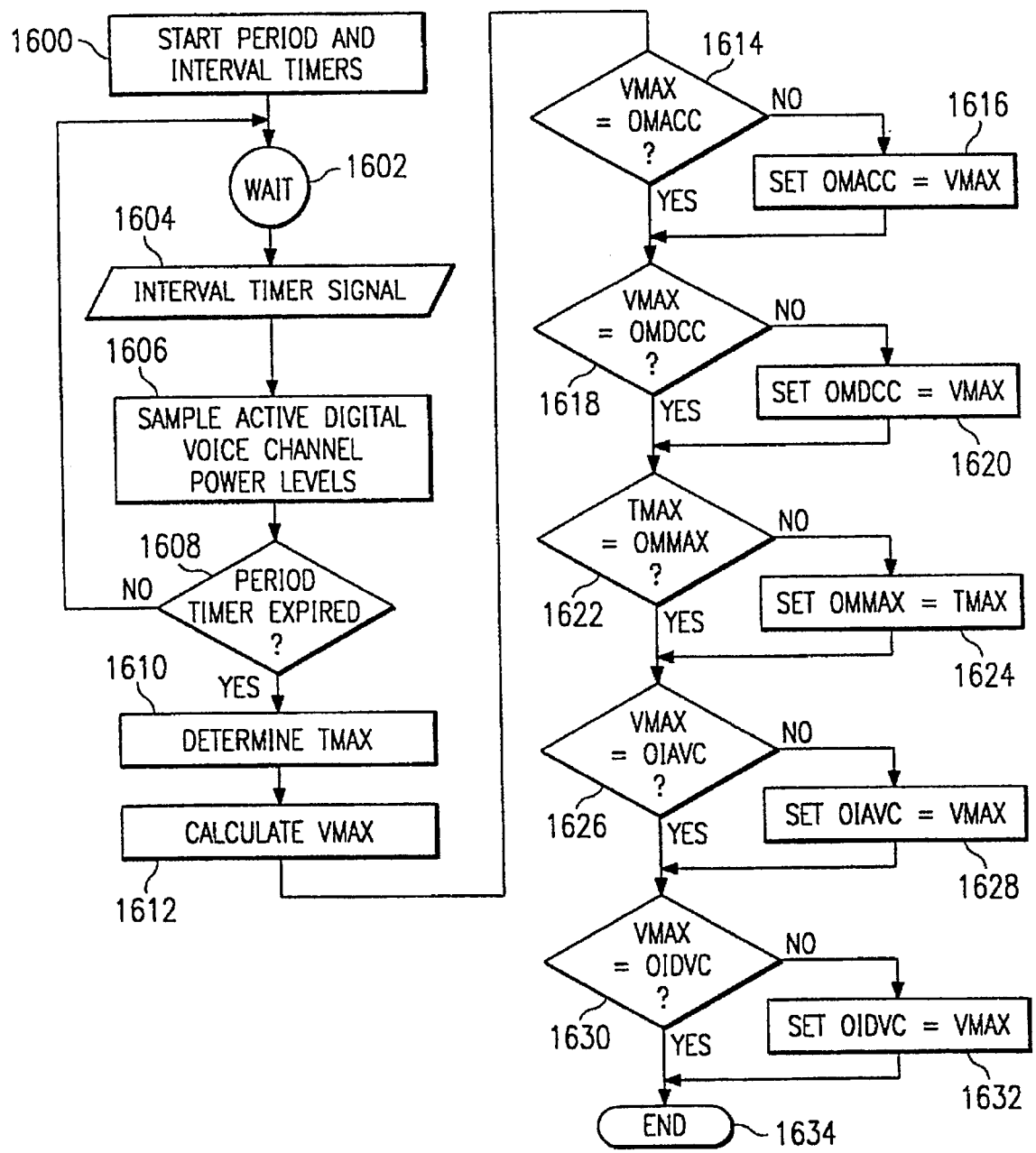
FIG. 16 is a flow chart illustrating the functions performed in accordance with the invention when automatically setting output power values for a mobile station.

FIG. 16 is a flow chart illustrating the functions performed in accordance with the invention when setting output power values for a base station in a system using digital voice channel power regulation. The process begins at Step 1600 where the sampling period and sampling interval timers are started. From Step 1600 the process moves to Step 1602 and waits for a sampling interval signal from the sampling timer. When a sampling signal is received the process moves from Step 1604 to Step 1606 where the voice channels in use by the mobile stations in the area of a base station are sampled. The process then moves from Step 1606 to Step 1608. At Step 1608 it is determined if the sampling period timer has expired. If, at Step 1608, it is found that the sampling period timer has not expired, the process moves back to Step 1602 and waits for another sampling timer signal. If, however, at Step 1608, it is found that the sampling period timer has expired, the process moves from Step 1608 to Step 1610.

At Step 1610 the process determines TMax from the sampled power levels. From Step 1610 the process moves to Step 1612. At Step 1612 VMax is calculated from the sampled values. The process then moves from Step 1612 to Step 1614 where VMax and OMACC are compared. If, at 1614, it is determined that VMax and OMACC are not equal, the process moves from Step 1614 to Step 1616 and at Step 1616 sets OMACC to the value of VMax. The process then moves from Step 1616 to Step 1618. If, however at Step 1614, it is determined that VMax is equal to OMACC the process will move directly from Step 1614 to Step 1618.

At Step 1618 VMax and OMDCC are compared. If, at Step 1618, it is determined that VMax and OBAVC are not equal the process moves from Step 1618 to Step 1620, and at Step 1620 sets OBAVC to the value of VMax. The process then moves from Step 1620 to Step 1622. If, however at Step 1618, it is determined that VMax and OBAVC are equal the process will move directly from Step 1618 to Step 1622.

At Step 1622 TMax and OMMAX are compared. If, at Step 1622, it is determined that TMax and OMMAX are not equal the process moves from Step 1622 to Step 1624, and at Step 1624 sets OMMAX to the value of TMax. The process then moves from Step 1624 to Step 1626. If, however at Step 1622, it is determined that TMax and OMMAX are equal the process will move directly from Step 1626 to Step 1626.

At Step 1626 VMax and OIAVC are compared. If, at Step 1626, it is determined that VMax and OIAVC are not equal the process moves from Step 1626 to Step 1628, and at Step 1628 sets OIAVC to the value of VMax. The process then moves from Step 1628 to Step 1630. If, however at Step 1626, it is determined that VMax and OIAVC are equal the process will move directly from Step 1626 to Step 1630.

At Step 1630 VMax is compared with OIDVC. If, at Step 1630, it is determined that VMax and OIDVC are equal the process moves to Step 1632, where the process ends. If, however, at Step 1830 it is determined that OIDVCC and VMax are not equal the process moves to Step 1632 and, at 1632, sets OIDVC to the value of VMax. The process then moves from Step 1632 to Step 1634 where the process ends.

As has been described, base stations and mobile stations for digital mobile radio systems include processors and memories capable of processing and storing the measured and calculated values necessary for implementation of the invention. As will be understood, the various steps of the process may be performed in either the base station or mobile station, depending on the choice of implementation. The selection of an appropriate processor for use in a particular stage of the inventive method will naturally depend on the extent to which the measurement values are collected, stored and processed in the base station or the mobile station.

One of the benefits of this invention is that the general level of transmitted power by mobile stations and base stations will be reduced, with a concomitant decrease in radio interference. The quality of transmission between base stations and mobile stations will be less interference-limited and mostly propagation-limited.

Since the entire radio network will adapt itself to lower interference levels, it uses the exact amount of power required on all channels. There will be gains in radio capacity, and reduction in mobile station current drain on the batteries due to reduced mobile station output power levels. The benefits will be the same whether the process is fully automated or the operator manually alters the power levels according to the reports from this system.

It will be apparent to one skilled in the art that this invention has application to all types of systems in which functions equivalent to digital voice channel power regulation are implemented and that many variations of the invention are possible. For example, it would be possible to apply the invention to a purely digital system and use the invention to set power values of digital channels only.

It is thus believed that the operation and construction of the present invention will be apparent from the foregoing description. While the method, apparatus and system has been shown and described as a particular embodiment, it will be readily apparent that various changes and modifications could be made therein without departing from the spirit and scope of the invention as defined in the following claims.

What is claimed is:

1. In a telecommunications system which includes one or more first transceiving devices and one or more second transceiving devices, said first and second transceiving devices communicating over one or more channels comprised of automatically regulated and non-regulated channels, a method of setting output power level parameters in one of said first transceiving devices comprising the steps of:

determining a maximum output power level used on one or more of said automatically regulated channels;

comparing said maximum output power level with set output power levels for one or more of said non-regulated channels; and reporting discrepancies between said maximum output power level and said set output power levels for said one or more non-regulated channels.

2. The method of claim 1 in which said one or more automatically regulated channels are digital voice channels.

3. The method of claim 1 in which the step of determining a maximum output power level comprises the steps of:
   starting a first and second timer;
   sampling output power levels on each of said one or more automatically regulated channels to obtain sampled output power levels, said sampling taking place during repeated intervals determined by said first timer;
   terminating said step of sampling when said second timer expires;
   determining a maximum power level from said sampled output power levels.

4. The method of claim 1 in which the step of determining a maximum output power level comprises the steps of:
   starting a timer;
   sampling output power levels on each of said one or more automatically regulated channels to obtain sampled output power levels, said sampling taking place each time the output power levels are set to a new value;
   terminating said step of sampling when said timer expires;
   determining a maximum power level from said sampled output power levels.

5. The method of claim 1 in which the step of determining a maximum output power level comprises the steps of:
   starting a first and second timer;
   sampling output power levels on each of said one or more automatically regulated channels to obtain sampled output power levels, said sampling taking place during repeated intervals determined by said first timer;
   terminating said step of sampling when said second timer expires;
   determining a virtual maximum power level for said sampled output power levels.

6. The method according to claim 5, in which said step of determining a virtual maximum power level comprises the step of calculating a power level which is equal to or greater than the power level used for a set percentage of said sampled output power levels.

7. The method of claim 1 in which the step of determining a maximum output power level comprises the steps of:
   starting a timer;
   sampling output power levels on each of said one or more automatically regulated channels to obtain sampled output power levels, said sampling taking place each time the output power levels are set to a new value;
   determining a virtual maximum power level for said sampled output power levels.

8. The method according to claim 7, in which said step of determining a virtual maximum power level comprises the step of calculating a power level which is equal to or greater than the power level used for a set percentage of said sampled output power levels.

9. The method of claim 1 in which the step of comparing comprises the steps of:
   determining if said maximum output power level is equal to an operator defined power level for a non-regulated analog control channel.

10. The method of claim 1 in which the step of comparing comprises:
    determining if said maximum output power level is equal to an operator defined power level for a non-regulated analog voice channel.

11. The method of claim 1 in which the step of comparing comprises:
    determining if said maximum output power level is equal to an operator defined power level for non-regulated digital control channel.

12. The method of claim 1 in which the step of comparing comprises:
    determining if said maximum output power level is equal to an operator defined maximum power level for digital voice channel power regulation.

13. The method of claim 1 in which the step of comparing comprises:
    determining if said maximum output power level is equal to an operator defined initial power level for a non-regulated analog voice channel.

14. The method of claim 1 in which the step of comparing comprises:
    determining if said maximum output power level is equal to an operator defined initial power level for a non-regulated digital voice channel.

15. The method of claim 1 further comprising the step of:
    setting each of said set output power levels for said one or more non-regulated channels to said maximum output power level with which it is compared in response to an indication that said step of reporting indicates an inequality.

16. The method of claim 1 in which said first transceiving device comprises a mobile station and said second transceiving device comprises a base station.

17. The method of claim 1 in which said first transceiving device comprises a base station and said second transceiving device comprises a mobile station.

18. In a telecommunications system which includes one or more first transceiving devices and one or more second transceiving devices, said first and second transceiving devices communicating over one or more channels comprised of automatically regulated and non-regulated channels, a system for setting output power level parameters in one of said first transceiving devices comprising:
    means for determining a maximum output power level used on one or more of said automatically regulated channels;
    means for comparing said maximum output power level with set output power levels for one or more of said non-regulated channels; and
    means for reporting discrepancies between said maximum output power level and said set output power levels for said one or more non-regulated channels.

19. The system of claim 18 in which said one or more automatically regulated channels are digital voice channels.

20. The system of claim 18 in which said means for determining a maximum output power level comprises the steps of:
    means for starting a first and second timer;
    means for sampling output power levels on each of said one or more automatically regulated channels to obtain sampled output power levels, said sampling taking place during repeated intervals determined by said first timer;
    means for terminating sampling when said second timer expires;
    means for determining a maximum power level from said sampled output power levels.

21. The system of claim 18 in which said means for determining a maximum output power level comprises the steps of:

means for starting timer;

means for sampling output power levels on each of said one or more automatically regulated channels to obtain sampled output power levels, said sampling taking place each time the output power levels are set to a new value;

means for determining a maximum power level from said sampled output power levels.

22. The system of claim 18 in which said means for determining a maximum output power level comprises:

means for starting a first and second timer;

means for sampling output power levels on each of said one or more automatically regulated channels to obtain sampled output power levels, said sampling taking place during repeated intervals determined by said first timer;

means for terminating sampling when said second timer expires;

means for determining a virtual maximum power level for said sampled output power levels.

23. The system according to claim 22, in which said means for determining a virtual maximum power level comprises means for calculating a power level which is equal to or greater than the power level used for a set percentage of said sampled output power levels.

24. The system of claim 18 in which said means for determining a maximum output power level comprises the steps of:

means for starting a timer;

means for sampling output power levels on each of said one or more automatically regulated channels to obtain sampled output power levels, said sampling taking place each time the output power levels are set to a new value;

means for terminating sampling when said second timer expires;

means for determining a virtual maximum power level for said sampled output power levels.

25. The system according to claim 24, in which said means for determining a virtual maximum power level comprises means for calculating a power level which is equal to or greater than the power level used for a set percentage of said sampled output power levels.

26. The system of claim 18 in which said means for comparing comprises:

means for determining if said maximum output power level is equal to an operator defined power level for a non-regulated analog control channel.

27. The system of claim 18 in which said means for comparing comprises:

means for determining if said maximum output power level is equal to an operator defined power level for a non-regulated analog voice channel.

28. The system of claim 18 in which said means for comparing comprises:

means for determining if said maximum output power level is equal to an operator defined power level for a non-regulated digital control channel.

29. The system of claim 18 in said means for comparing comprises:

means for determining if said maximum output power level is equal to an operator defined maximum power level for digital voice channel power regulation.

30. The system of claim 18 in which said means for comparing comprises:

means for determining if said maximum output power level is equal to an operator defined initial power level for a non-regulated analog voice channel.

31. The system of claim 18 in which said means for comparing comprises:

means for determining if said maximum output power level is equal to an operator defined initial power level for a non-regulated digital voice channel.

32. The system of claim 18 further comprising:

means for setting each of said set output power levels for said one or more non-regulated channels to said maximum output power level with which it is compared in response to an indication that said means for reporting indicates an inequality.

33. The system of claim 18 in which said first transceiving device comprises a mobile station and said second transceiving device comprises a base station.

34. The system of claim 18 in which said first transceiving device comprises a base station and said second transceiving device comprises a mobile station.

* * * * *

UNITED STATES PATENT AND TRADEMARK OFFICE
CERTIFICATE OF CORRECTION

PATENT NO. : 5,634,195
DATED : May 27, 1997
INVENTOR(S) : Sawyer

It is certified that error appears in the above-indentified patent and that said Letters Patent is hereby corrected as shown below:

Column 6, line 61  Replace "c/I"
With --C/I--

Column 7, line 64  Replace "G"
With --$\alpha$--

Column 8, line 1  Replace "G"
With --$\alpha$--

Column 13, line 16  Delete "5"

Column 14, line 15  Replace "OMMAX"
With --OMMax--

Column 15, line 31  Replace "an"
With --a--

Signed and Sealed this

Twenty-third Day of December, 1997

Attest:

BRUCE LEHMAN

*Attesting Officer*     *Commissioner of Patents and Trademarks*